US011277691B2

United States Patent
Girardier et al.

(10) Patent No.: US 11,277,691 B2
(45) Date of Patent: Mar. 15, 2022

(54) CONTROLLING DUAL-MODE BLUETOOTH LOW ENERGY MULTIMEDIA DEVICES

(71) Applicant: Google LLC, Mountain View, CA (US)

(72) Inventors: Thomas Girardier, Poisy (FR); Julien Goupy, Le Mesnil-Saint-Denis (FR); Nicolas Guezellot Prudhomme, Paris (FR)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/757,234

(22) PCT Filed: Oct. 12, 2018

(86) PCT No.: PCT/EP2018/077859
§ 371 (c)(1),
(2) Date: Apr. 17, 2020

(87) PCT Pub. No.: WO2019/076747
PCT Pub. Date: Apr. 25, 2019

(65) Prior Publication Data
US 2021/0195334 A1 Jun. 24, 2021

(30) Foreign Application Priority Data
Oct. 20, 2017 (EP) .................................... 17306446

(51) Int. Cl.
*H04R 5/00* (2006.01)
*H04R 5/04* (2006.01)
(Continued)

(52) U.S. Cl.
CPC ........... *H04R 5/04* (2013.01); *H04L 65/4069* (2013.01); *H04L 65/608* (2013.01); *H04W 4/80* (2018.02); *H04R 2420/07* (2013.01)

(58) Field of Classification Search
CPC ...................................................... H04R 5/00
See application file for complete search history.

(56) References Cited

U.S. PATENT DOCUMENTS

| 8,712,328 | B1 | 4/2014 | Filev et al. |
| 9,319,782 | B1 | 4/2016 | Crump et al. |

(Continued)

FOREIGN PATENT DOCUMENTS

| CN | 102064857 A | 5/2011 |
| CN | 103139690 A | 6/2013 |

(Continued)

OTHER PUBLICATIONS

International Search Report, dated Jan. 4, 2019, from corresponding PCT application No. PCT/EP2018/077859.

(Continued)

*Primary Examiner* — Olisa Anwah
(74) *Attorney, Agent, or Firm* — Lerner, David, Littenberg, Krumholz & Mentlik, LLP

(57) ABSTRACT

Disclosed is a device for controlling a dual-mode Bluetooth low energy multimedia device, the dual-mode BLE multimedia device including a first sound system and a second sound system which are arranged to simultaneously stream an input multimedia stream, the first and second sound systems being respectively associated with at least one first Bluetooth multimedia device and at least one Bluetooth multimedia device. Also disclosed is a dual-mode Bluetooth low energy multimedia device, a method, a computer program and a non-transitory computer-readable storage medium.

20 Claims, 7 Drawing Sheets

(51) Int. Cl.
  *H04W 4/80*    (2018.01)
  *H04L 65/61*    (2022.01)
  *H04L 65/65*    (2022.01)

(56) References Cited

U.S. PATENT DOCUMENTS

| | | | |
|---|---|---|---|
| 9,569,173 B1* | 2/2017 | Coleman | G06F 3/165 |
| 2008/0291863 A1 | 11/2008 | Agren | |
| 2008/0291891 A1 | 11/2008 | Jerlhagen et al. | |
| 2014/0057569 A1 | 2/2014 | Toivanen et al. | |
| 2014/0348327 A1 | 11/2014 | Linde et al. | |
| 2016/0044622 A1* | 2/2016 | Crowe | H04N 21/4302 |
| | | | 709/231 |
| 2017/0006331 A1* | 1/2017 | Jai | H04N 21/4344 |
| 2017/0034263 A1 | 2/2017 | Archambault et al. | |
| 2017/0230810 A1* | 8/2017 | Banerjea | H04W 4/80 |
| 2019/0349718 A1* | 11/2019 | Kwon | H04W 12/0431 |

FOREIGN PATENT DOCUMENTS

| | | |
|---|---|---|
| CN | 104467925 A | 3/2015 |
| CN | 104883655 A | 9/2015 |

OTHER PUBLICATIONS

Office Action for Chinese Patent Application No. 201880080379.8 dated Dec. 31, 2021. 5 pages.

* cited by examiner

CONTROLLING DUAL-MODE BLUETOOTH LOW ENERGY MULTIMEDIA DEVICES

TECHNICAL FIELD

The description relates in particular to a device for controlling dual-mode Bluetooth low energy multimedia devices, in particular Bluetooth headsets or loudspeakers, also known as wireless speakers. Similar devices are known from patent documents US 2014057569A1, U.S. Pat. No. 8,712,328B1, US 2008291891A1 and US 2014348327A1.

BACKGROUND ART

The Bluetooth low energy (BLE) is a specification that enables radio frequency communication operating within the globally accepted 2.4 GHz Industrial, Scientific & Medical (ISM) band. The BLE specification supports a physical layer bit rate of 2 Mbit/s over a range of 5 to 15 meters.

The BLE specification features several implementations, one of which is a "dual-mode". In the dual-mode implementation, BLE functionality is an add-on feature within traditional Bluetooth, namely, Bluetooth Basic Rate (BR) and Bluetooth Enhanced Data Rate (EDR). In practice, within a dual-mode chip, a BR/EDR radio and a BLE radio share the same RF chain. Further, the two stacks are integrated and implemented within a single processor and protocol stack. The dual-mode implementation is mostly targeted at mobile devices and personal computers. A major application of dual-mode BLE devices is the delivery of multimedia streams such as audio streams.

However, as for now, an audio profile over BLE is in preparation and should be included in future Bluetooth specifications. As it has been the case recently with BR/EDR audio devices, the future BLE audio profile will allow streaming audio synchronously and simultaneously to multiple BLE multimedia devices, using multicast and broadcast communication. Unfortunately, it is pretty clear that the BLE audio profile won't support any retro-compatibility with existing BR/EDR audio devices since BR/EDR and BLE achieve operate in a completely different manner.

Therefore, dual-mode BLE multimedia devices will face synchronization problems of the different sound systems, since an input audio stream could be sent to the BR/EDR sound system and to the BLE sound system. In fact, in such case, BR/EDR sound system and BLE sound system will only have their respective audio devices synchronized together. In contrast, BR/EDR sound system and BLE sound system will not be synchronized together.

Thus, there is a need for a way to synchronize both sound systems of a dual-mode BLE multimedia devices to keep a compatibility between BR/EDR multimedia devices and future BLE multimedia devices.

SUMMARY OF INVENTION

The invention relates in particular to a device for controlling a dual-mode Bluetooth low energy (DM-BLE) multimedia device according to claim 1.

This device is advantageous in that it enables the simultaneous synchronization of both sound systems of a dual-mode BLE multimedia device. Further, said device may be directly integrated in the dual-mode BLE multimedia device.

The invention also relates to a dual-mode Bluetooth low energy (DM-BLE') multimedia device according to claim 3.

This device is advantageous in that it enables the simultaneous synchronization of both sound systems of a dual-mode BLE multimedia device, directly in the dual-mode BLE multimedia device.

The invention also refers to a system according to claim 5.

The invention also refers to a method of controlling a dual-mode Bluetooth low energy (DM-BLE) multimedia device according to claim 8 and also to a method of controlling a dual-mode Bluetooth low energy (DM-BLE') multimedia device according to claim 10.

The invention also refers to a computer program comprising a series of instructions that, when they are executed by a processor, implements the method according the invention.

The invention also refers to a non-transitory computer-readable storage medium, storing the computer program according to the invention.

The devices and method according to the invention may comprise one or more of the embodiments taken alone or in combination, as discussed below in the description.

BRIEF DESCRIPTION OF DRAWINGS

Other characteristics and advantages of the invention will appear upon reading the following description.

The description is purely illustrative and should be read in conjunction with the appended drawings, in which.

DESCRIPTION OF EMBODIMENTS

The following embodiments are examples. Although the description refers to one or more embodiments, this does not necessarily mean that each element mentioned in the context of one embodiment relates only to that embodiment, or that features of that embodiment apply only to that embodiment.

Figure 1:
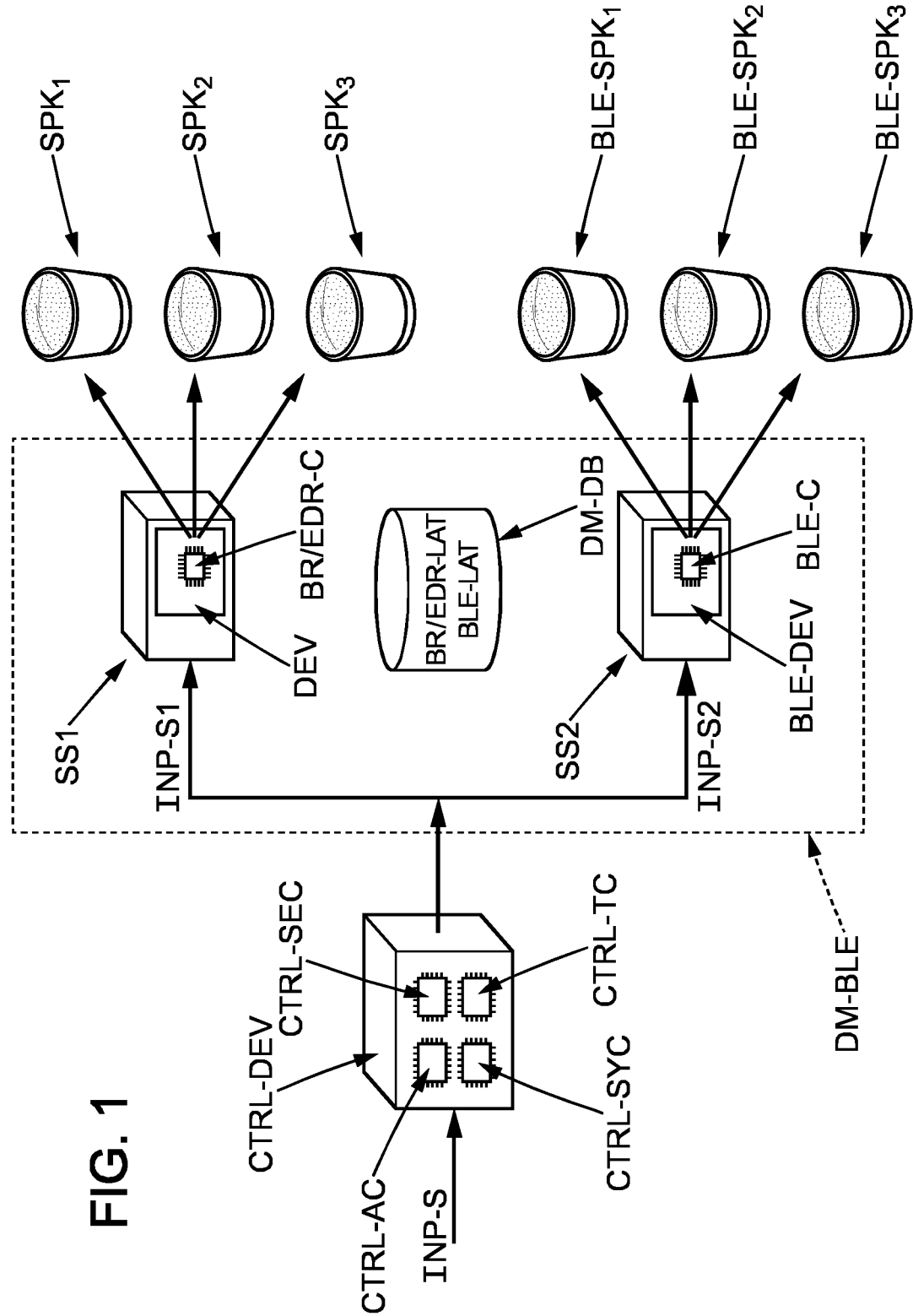
FIG. 1 illustrates a system comprising the device CTRL-DEV according to an embodiment of the invention as well as a set of Bluetooth speakers.

FIG. 1 illustrates a system comprising a device CTRL-DEV for controlling a dual-mode Bluetooth low energy multimedia device DM-BLE. As already explained above, a dual-mode Bluetooth low energy multimedia device DM-BLE can connect to BR/EDR devices as well as BLE devices. A typical dual-mode device would be a smartphone having the BR/EDR and BLE capabilities comprised in a single chip. However, in another typical case, the dual-mode device comprises one or multiple chips dedicated for supporting BR/EDR capabilities and one or multiple chips dedicated for supporting BLE capabilities. In that case, the invention may be implemented in a controller or processor of the dual-mode device (e.g. the operating system of a smartphone). Therefore, in accordance with the invention, a dual-mode device should be understood as a device supporting BR/EDR and BLE capabilities, whatever the hardware arrangement.

In an example, the control device CTRL-DEV is a dedicated device, or an optional additional module to be attached physically or wirelessly to the dual-mode Bluetooth low energy multimedia device DM-BLE. In another example the control device CTRL-DEV may be a processor, computer, a mobile phone or a tablet.

The dual-mode Bluetooth low energy multimedia device DM-BLE of FIG. 1 comprises a first sound system SS1 and a second sound system SS2. A sound system is known to be a set of equipments for playing a multimedia stream.

The first sound system SS1 comprises a device DEV for controlling at least one of a first set of wireless speakers SPK1, SPK2 and SPKN. The device DEV comprises a BR/EDR communication circuit BR/EDR-C enabling communication with the first set of wireless speakers SPK1, SPK2 and SPKN. In an embodiment, the BLE communication circuit BLE-C comprises a BR/EDR controller. In an example, the BR/EDR controller comprises a BR/EDR audio stack and a BR/EDR chip.

The second sound system SS2 comprises a device BLE-DEV for controlling at least one of a second set of wireless speakers BLE-SPK1, BLE-SPK2 and BLE-SPKN. The device BLE-DEV comprises a BLE communication circuit BLE-C enabling communication with the second set of wireless speakers BLE-SPK1, BLE-SPK2 and BLE-SPKN. In an embodiment, the BLE communication circuit BLE-C comprises a BLE controller. In an example, the BLE controller comprises a BLE audio stack and a BLE chip.

In an example, a wireless speaker SPK1, SPK2, SPKN, BLE-SPK1, BLE-SPK2 and BLE-SPKN may be a mobile phone comprising a speaker capable of acting as a loudspeaker. In another example, a wireless speaker SPK1, SPK2, SPKN, BLE-SPK1, BLE-SPK2 and BLE-SPKN may be a television comprising a wireless interface such as WiFi or Bluetooth, a computer comprising a wireless network card (WiFi, Bluetooth, etc.), or a WiFi or Bluetooth tablet.

The first sound system SS1 and second sound system SS2 are arranged to simultaneously stream an input multimedia stream INP-S to the respective wireless speakers SPK1, SPK2, SPKN, BLE-SPK1, BLE-SPK2 and BLE-SPKN. In an embodiment, the input multimedia stream INP-S is an audio stream. In an example, the audio stream comprises a plurality of distinct multiplexed streams (for example left stereo channel and right stereo channel). For example, the input multimedia stream INP-S comprises six audio streams where each stream corresponds to one of the 5.1 channels of an audio recording.

In the example of FIG. 1, the device CTRL-DEV comprises an access circuit CTRL-AC arranged to obtain a first latency value BR/EDR-LAT and a second latency value BLE-LAT of the first sound system SS1 and the second sound system SS2, respectively. In the context of the device CTRL-DEV, the latency of a sound system is understood as the time taken for an input multimedia stream, such as the input multimedia stream INP-S, to travel from the input to the output of the sound system. In an embodiment, the access circuit CTRL-AC obtains a first latency value BR/EDR-LAT and a second latency value BLE-LAT from a database DM-DB of the dual-mode BLE multimedia device DM-BLE.

In another embodiment, as it is known that the latency of a sound system may vary over time, the access circuit CTRL-AC is further arranged to periodically obtain the first and second latency values BR/EDR-LAT, BLE-LAT.

The device CTRL-DEV further comprises a separation circuit CTRL-SEC arranged to separate the input multimedia stream INP-S into a first multimedia signal INP-S1 and a second multimedia signal INP-S2. In an embodiment, the separation circuit CTRL-SEC creates a copy of the input multimedia stream INP-S so as to obtain the first and second multimedia signals INP-S1, INP-S2. In another embodiment, the separation circuit CTRL-SEC recreates, from input multimedia stream INP-S, a greater number of streams for each of the first multimedia signal INP-S1 and the second multimedia signal INP-S2. For example, the separation circuit can recreate a multichannel environment (for example 5.1 surround sound) from a single stream (by signal processing) for each of the first and second multimedia signals INP-S1, INP-S2.

The device CTRL-DEV further comprises a synchronization circuit CTRL-SYC arranged to delay the first multimedia signal INP-S1 and the second multimedia signal INP-S2 based on the first and second latency values BR/EDR-LAT, BLE-LAT.

In an embodiment, the synchronization circuit CTRL-SYC is further arranged to:
  determine a maximum latency value MAX-LAT between the first and second latency value BR/EDR-LAT, BLE-LAT,
  determine a first subtraction value SUB1 and a second subtraction value SUB2 by respectively subtracting the first and second latency value BR/EDR-LAT, BLE-LAT from the maximum latency value MAX-LAT, and
  delay the first and second multimedia signals INP-S1, INP-S2 by the first and a second subtraction value SUB1, SUB2, respectively.

In that case, the maximum latency value MAX-LAT may be understood as the global latency of dual-mode Bluetooth low energy multimedia device DM-BLE.

In another embodiment, the synchronization circuit CTRL-SYC is further arranged to further delay the first multimedia signal INP-S1 and the second multimedia signal INP-S2 by a predetermined latency value R. In an example, the predetermined latency value R is zero or positive. The predetermined latency value may be needed for synchronization algorithms of both of the first and second sound systems SS1, SS2. In that embodiment, the global latency of dual-mode Bluetooth low energy multimedia device DM-BLE may correspond to a sum value obtained by summing the maximum latency value MAX-LAT with the predetermined latency value R. In an example, the predetermined latency value R may be used to synchronise the dual-mode Bluetooth low energy multimedia device DM-BLE with another device or system which exhibits a latency value LAT-EXT which is not under the control of the control device CTRL-DEV or the dual-mode Bluetooth low energy multimedia device DM-BLE. In that example, the latency value LAT-EXT is greater than the maximum latency value MAX-LAT of the dual-mode Bluetooth low energy multimedia device DM-BLE. Hence, for instance, the predetermined latency value R is obtain based on the latency value LAT-EXT and the maximum latency value MAX-LAT. For example, the predetermined latency value R is obtained by subtracting the maximum latency value MAX-LAT from the latency value LAT-EXT. In an embodiment, the predetermined latency value R is a fixed latency value, the predetermined latency value R is a variable latency value. In yet another embodiment, the predetermined latency value R comprises a plurality of values where each value is associated with a particular state of the another device or system.

Finally, the device CTRL-DEV comprises a transmission circuit CTRL-TC arranged to transmit the delayed versions of the first and second multimedia signals INP-S1, INP-S2 to the first and second sound systems SS1, SS2 respectively.

Figure 2:
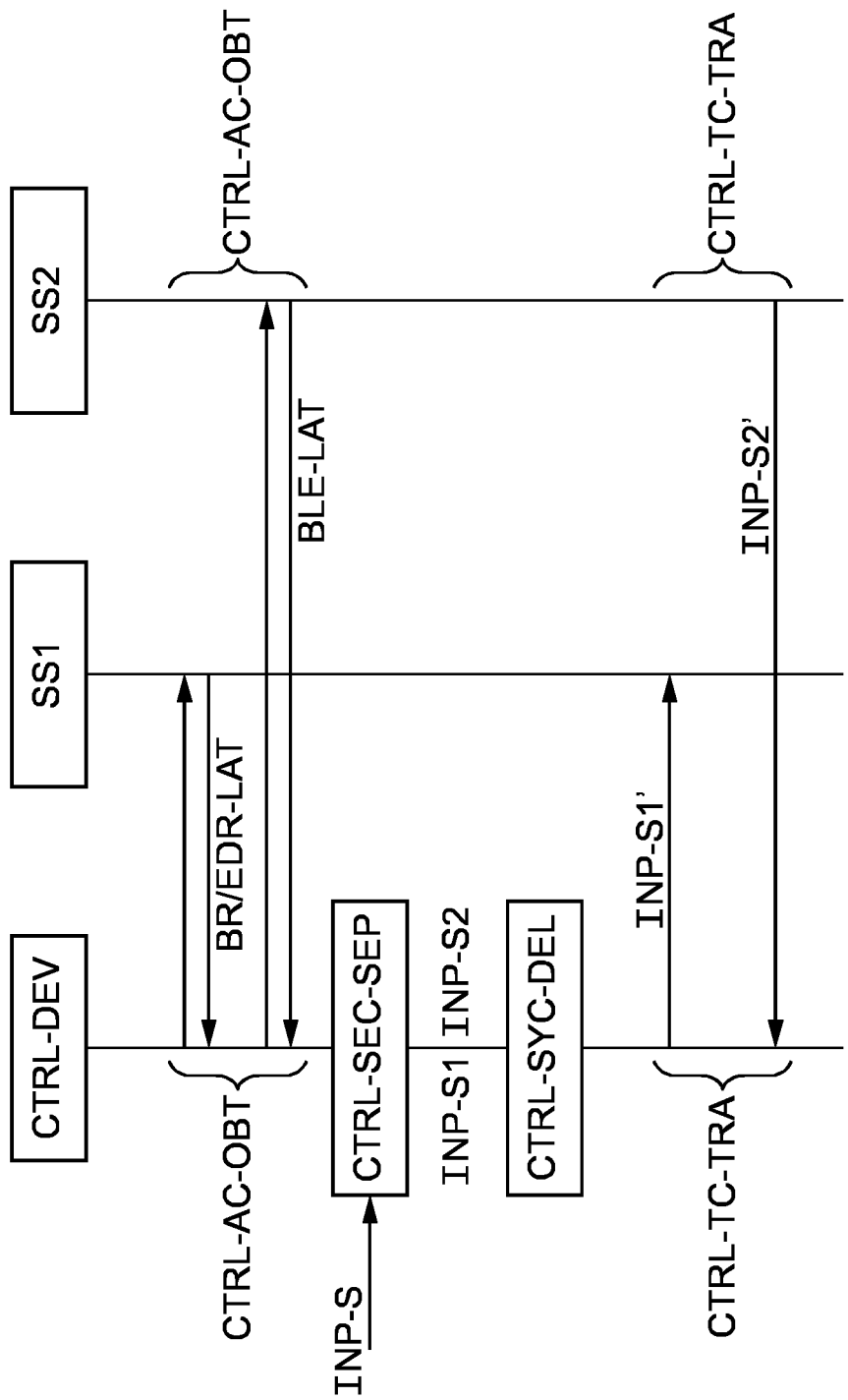
FIG. 2 illustrates a method according to an embodiment of the invention.

FIG. 2 illustrates a method according to one embodiment of the invention.

The method of FIG. 2 comprises the step of:
- obtaining CTRL-AC-OBT a first latency value BR/EDR-LAT and a second latency value BLE-LAT of the first sound system SS1 and the second sound system SS2, respectively,
- separating CTRL-SEC-SEP the input multimedia stream INP-S into a first multimedia signal INP-S1 and a second multimedia signal INP-S2,
- delaying CTRL-SYC-DEL the first multimedia signal INP-S1 and the second multimedia signal INP-S2 based on the first and second latency values BR/EDR-LAT, BLE-LAT, so as to obtain a first and second delayed multimedia signals INP-S1', INP-S2', respectively, and
- transmitting CTRL-TC-TRA the first and second delayed multimedia signals INP-S1', INP-S2' to the first and second sound systems SS1, SS2, respectively.

In an embodiment, the step of delaying CTRL-SYC-DEL further comprises:
- determining a maximum latency value MAX-LAT between the first and second latency value BR/EDR-LAT, BLE-LAT,
- determining a first subtraction value SUB1 and a second subtraction value SUB2 by respectively subtracting the first and second latency value BR/EDR-LAT, BLE-LAT from the maximum latency value MAX-LAT, and
- delaying the first and second multimedia signals INP-S1, INP-S2 by the first and a second subtraction value SUB1, SUB2, respectively.

In that case, the maximum latency value MAX-LAT may be understood as the global latency of dual-mode Bluetooth low energy multimedia device DM-BLE.

In a variant of the embodiment, there is included the step of further delaying the first and second multimedia signal by a predetermined latency value R. In an example, the predetermined latency value R is zero or positive. The predetermined latency value may be needed for synchronization algorithms of both of the first and second sound systems SS1, SS2. In that embodiment, the global latency of dual-mode Bluetooth low energy multimedia device DM-BLE may correspond to a sum value obtained by summing the maximum latency value MAX-LAT with the predetermined latency value R.

In another embodiment, the step of obtaining CTRL-AC-OBT further comprises obtaining the first and/or second latency values from a database DM-DB of the dual-mode BLE multimedia device DM-BLE.

In another embodiment, as it is known that the latency of a sound system may vary over time, the step of obtaining CTRL-AC-OBT further comprises periodically obtaining the first and second latency values BR/EDR-LAT, BLE-LAT.

According to an embodiment of the invention, a computer program comprises a series of instructions which, when executed by a processor, implement the method of FIG. 2. This computer program is written, for example, in a low-level language such as an assembly language, or in a higher level and more portable language such as the C language. According to one possible implementation, the computer program is divided into a plurality of modules. According to one possible implementation, the various modules are all written in the same language, for example the C language or an assembly language. Alternatively, some modules are written in different languages, for example some modules are written in C, others in an assembly language. According to one possible implementation, all the modules are stored in the same memory. Alternatively, some modules are stored in separate memories.

According to another embodiment of the invention, a computer-readable non-transitory storage medium stores a computer program according to the previous embodiment.

According to one possible implementation, the storage medium is a USB key, an SD card, or a micro SD card. In a variant, the storage medium is any memory card. In another variant, the storage medium is a memory chip which is intended to be mounted on an electronic circuit. These include, for example, an EEPROM, ROM, or Flash memory. According to one possible variant, the storage medium is a magnetic medium (for example hard drive) or optical medium (for example CD or DVD).

Figure 3:
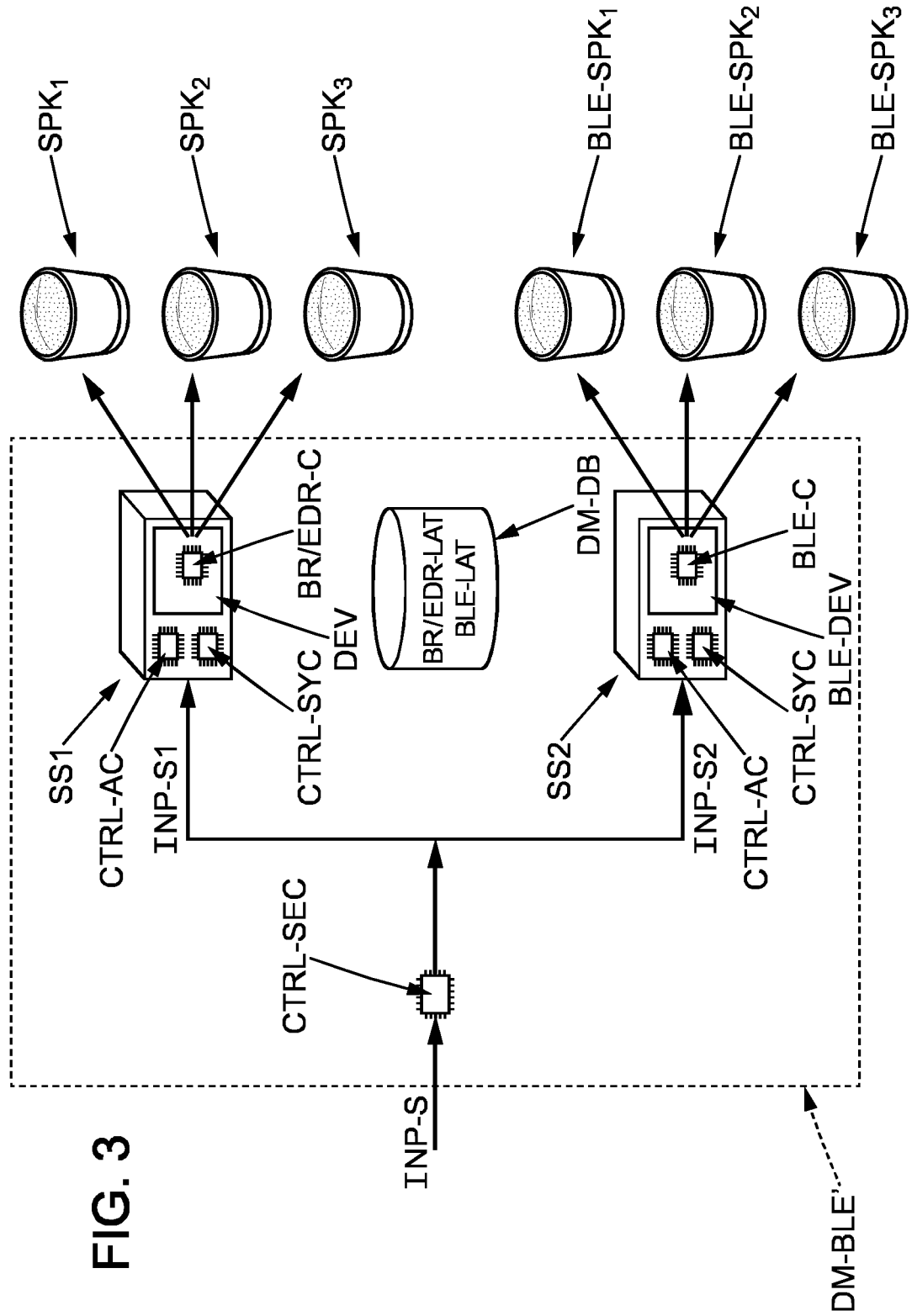
FIG. 3 illustrates a variant of the system of FIG. 1.

FIG. 3 illustrates a variant of the system of FIG. 1. In the example of FIG. 3, a modified version of dual-mode Bluetooth low energy multimedia device DM-BLE' integrates the components of the device CTRL-DEV of FIG. 1. The modified dual-mode Bluetooth low energy multimedia device DM-BLE' comprises the separation circuit CTRL-SEC, the first sound system SS1 and second sound system SS2 of the dual-mode Bluetooth low energy multimedia device DM-BLE of FIG. 1. However, the modified dual-mode Bluetooth low energy multimedia device DM-BLE' is different from the dual-mode Bluetooth low energy multimedia device DM-BLE of FIG. 1 in that:
- the first sound system SS1 comprises,
  - an access circuit CTRL-AC arranged to obtain a first latency value of the second sound system,
  - a synchronization circuit CTRL-SYC arranged to delay the first multimedia signal based on the first latency value and an internal latency value of the first sound system,
- the second sound system SS2 comprises,
  - an access circuit CTRL-AC arranged to obtain a second latency value of the first sound system,
  - a synchronization circuit CTRL-SYC arranged to delay the second multimedia signal based on the second latency value and an internal latency value of the second sound system.

In an embodiment, each of the synchronization circuits CTRL-SYC is further arranged to:
- determine a maximum latency value MAX-LAT between the obtained latency value and the internal latency value of the respective sound system,
- determine a subtraction value by subtracting the internal latency value of the respective sound system from the maximum latency value MAX-LAT, and
- delay the multimedia signal by the subtraction value, respectively.

In that case, the maximum latency value MAX-LAT may be understood as the global latency of dual-mode Bluetooth low energy multimedia device DM-BLE.

In an embodiment, both of the synchronization circuits CTRL-SYC are further arranged to further delay the respective multimedia signal by a predetermined latency value R. In an example, the predetermined latency value R is zero or positive. The predetermined latency value may be needed for synchronization algorithms of both of the first and second sound systems SS1, SS2. In that embodiment, the global latency of dual-mode Bluetooth low energy multimedia device DM-BLE may correspond to a sum value obtained by summing the maximum latency value MAX-LAT with the predetermined latency value R.

In another embodiment, each of the access circuits CTRL-AC is further arranged to obtain the latency value from a database DM-DB of the dual-mode BLE multimedia device DM-BLE.

In another embodiment, as it is known that the latency of a sound system may vary over time, each of the access circuits CTRL-AC is further arranged to periodically obtain first and second latency values BR/EDR-LAT, BLE-LAT.

A typical use case of the proposed invention could enable one to stream music from a smartphone using a dual-mode Bluetooth chip (BR/EDR and BLE) to multiple BR/EDR speakers and multiple BLE speakers.

Another typical use case of the proposed invention could enable one to stream music from a home device that integrates one or multiple BLE chips and one or multiple BR/EDR chips to multiple BR/EDR or BLE speakers.

A further typical usage of the proposed invention could enable one to watch a video on a TV that includes a dual-mode Bluetooth chipset using multiple BR/EDR and BLE headsets. In that use case, synchronizing all the devices permits to determine the exact latency of the whole system, thus allowing to achieve audio/video synchronization (lip sync) for all devices (for example by delaying the video for the global latency). For that particular usage, one may use the predetermined latency value R as explained above.

Figure 4:
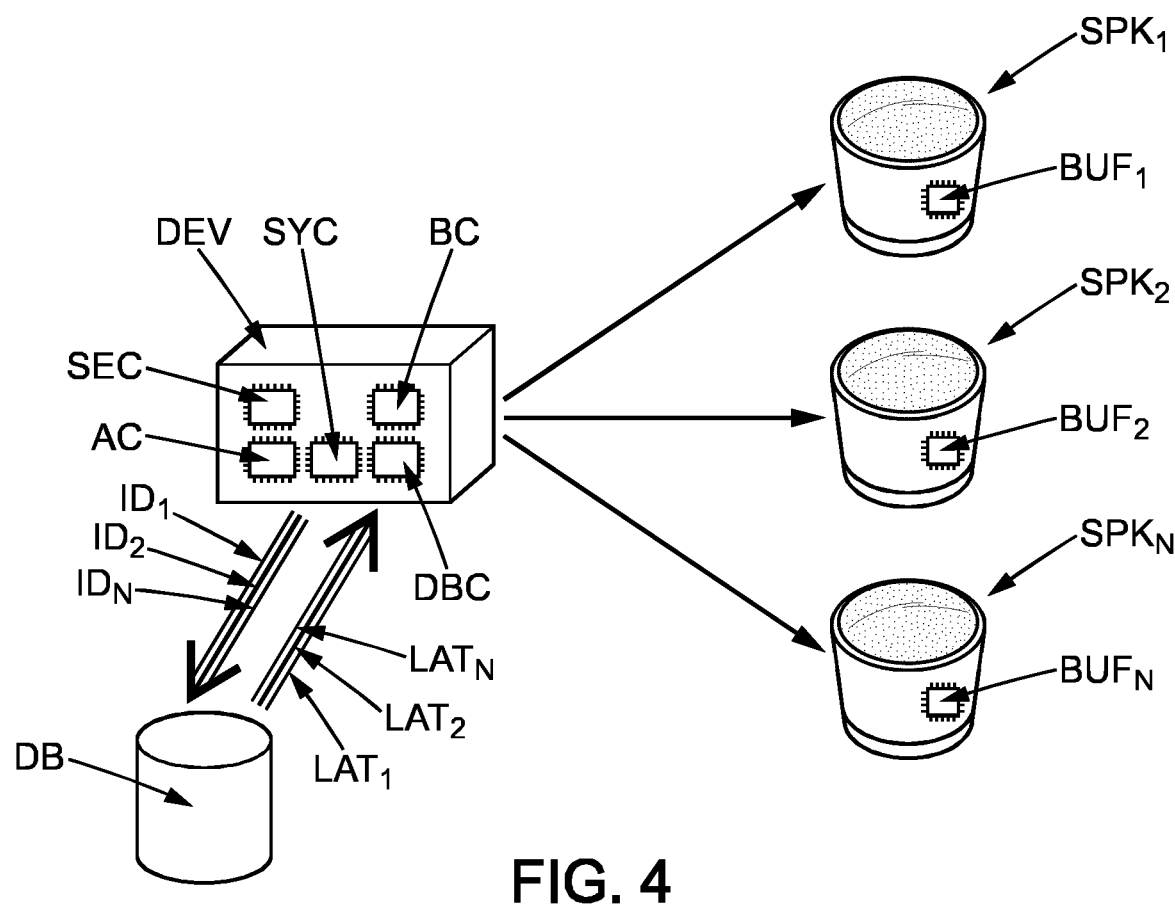
FIG. 4 illustrates a system comprising the device DEV of FIGS. 1 and/or 3, according to an embodiment of the invention as well as a set of Bluetooth speakers.
Figure 5:
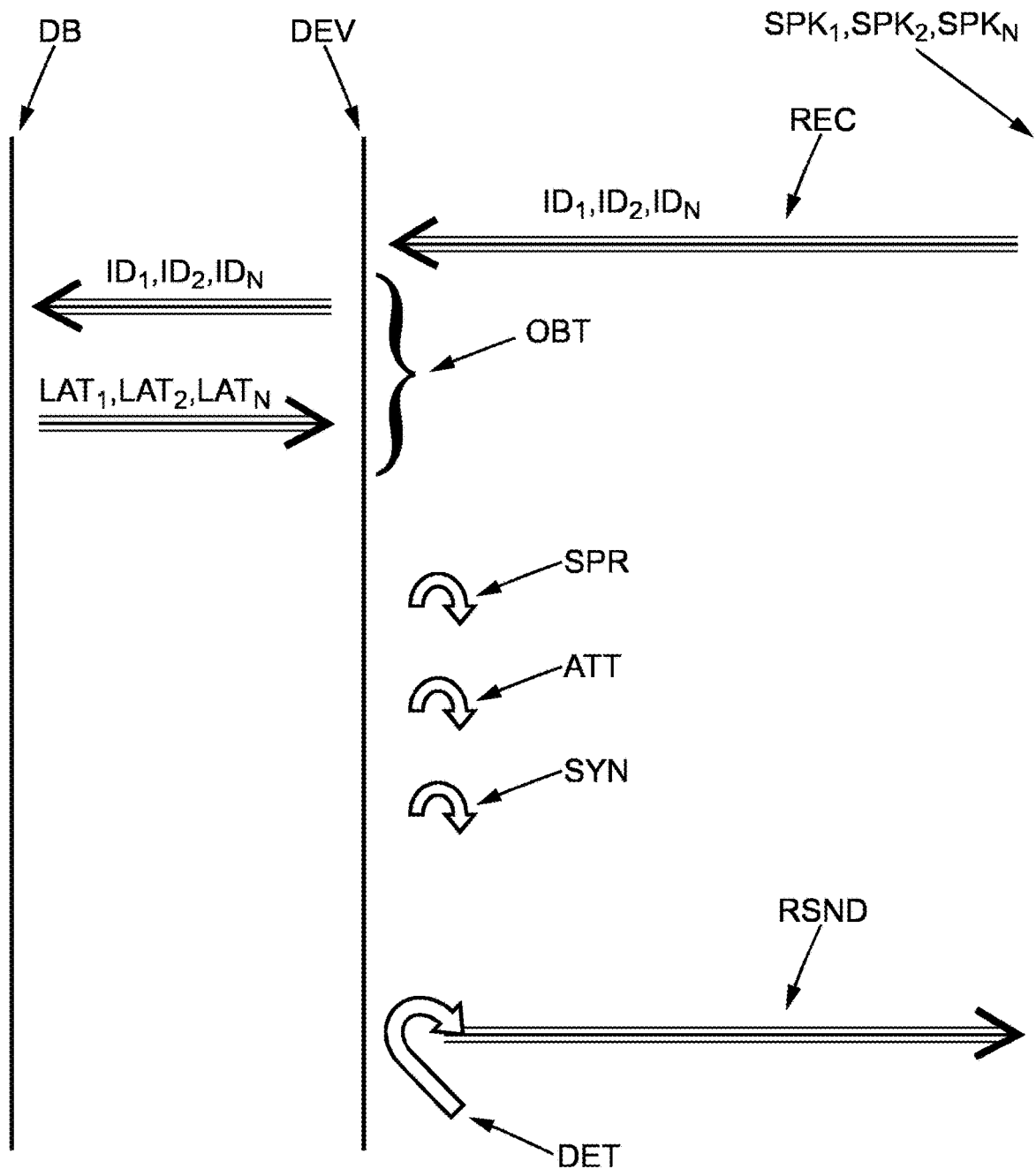
FIG. 5 illustrates a method according to an embodiment of the invention.

For the sake of completeness, reference is made to FIGS. 4 to 5, which describe techniques for performing synchronization between the plurality of wireless speakers SPK1, SPK2 and SPKN associated to the device DEV of FIG. 1 or 3.

FIG. 4 illustrates a system comprising the device DEV of FIG. 1 or 3 for controlling wireless speakers according to an embodiment of the invention, as well as a set of wireless speakers SPK1, SPK2 and SPKN each comprising a respective buffer memory BUF1, BUF2 and BUFN. The device DEV comprises a wireless communication circuit BC (such as a Bluetooth circuit) enabling communication with the wireless speakers SPK1, SPK2 and SPKN and in particular enabling identifying them. The device DEV comprises an access circuit DBC for accessing a database DB comprising information (such as latencies LAT1, LAT2 and LATN) about different types of wireless speakers, information associated with the identifiers ID1, ID2 and IDN of these different types of wireless speakers. The device DEV comprises a circuit SEC for separating a main audio stream into as many separated audio streams as the control device has received (via its wireless communication circuit) wireless speaker identifiers. The device DEV comprises an allocation circuit AC for allocating each separated audio stream to a respective wireless speaker. The device DEV comprises a synchronization circuit SYC for synchronizing the separated audio streams based on characteristics of the wireless speakers for which the wireless communication circuit has received an identifier.

FIG. 5 illustrates a method according to one embodiment of the example of FIG. 4.

The method comprises the receiving REC, via a wireless communication circuit BC, of the identifiers ID1, ID2 and IDN of wireless speakers SPK1, SPK2 and SPKN.

Based on these identifiers ID1, ID2 and IDN, the method comprises a step OBT of obtaining parameters LAT1, LAT2 and LATN associated with the various wireless speakers by sending the received identifiers to a database DB in order to obtain the requested parameters in return.

The method then comprises a step SPR of separating an audio stream into a number of audio sub-streams that is equal to the number of wireless speakers detected (for which the method has received the identifiers).

The method then comprises a step ATT of allocating each sub-stream to a respective wireless speaker.

The method then comprises a synchronization step SYN which ensures that the audio from the different sub-streams is played simultaneously by all the wireless speakers.

In the case in point, the method comprises additional steps.

In particular, in case of transmission error (loss of audio stream packet for example), a step RSND of resending lost or corrupted data followed by a step DET of determining a fill level of the buffer memory of each wireless speaker, in order to stop sending data if it appears to be pointless. If the conditions allow resending data, the data are resent. Otherwise, the method will abort the procedure for recovering lost data, as this would take too long and could result in loss of synchronization.

Figure 6:
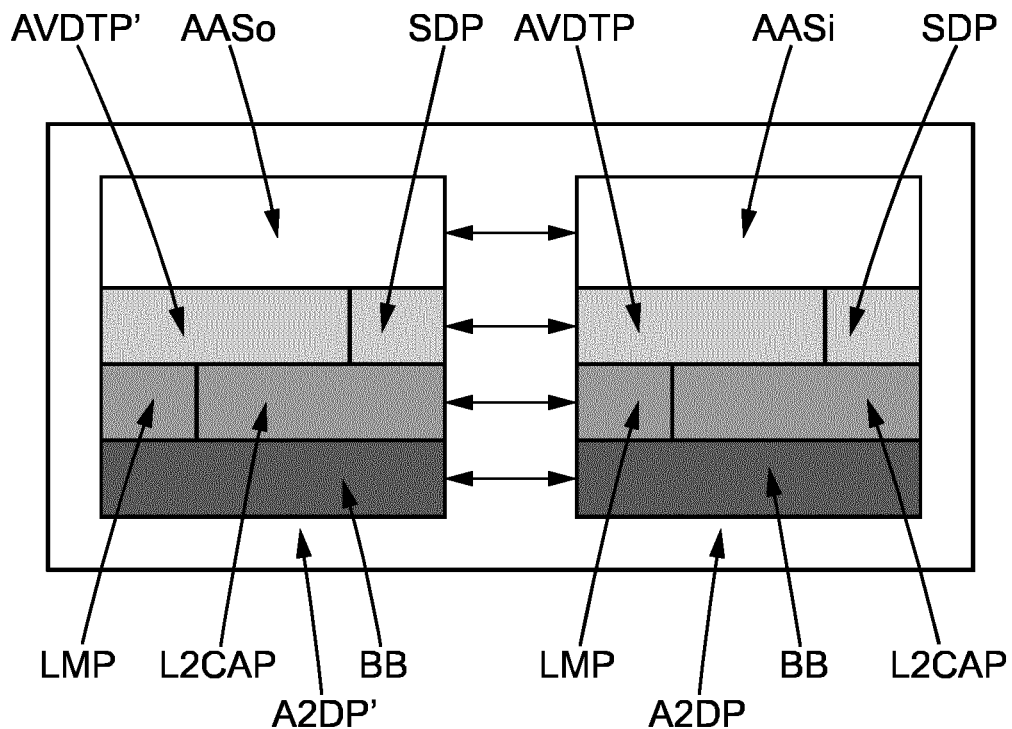
FIG. 6 illustrates a conventional A2DP profile, as well as an A2DP' profile according to an embodiment of the invention arranged to communicate with the conventional A2DP profile.
Figure 7:
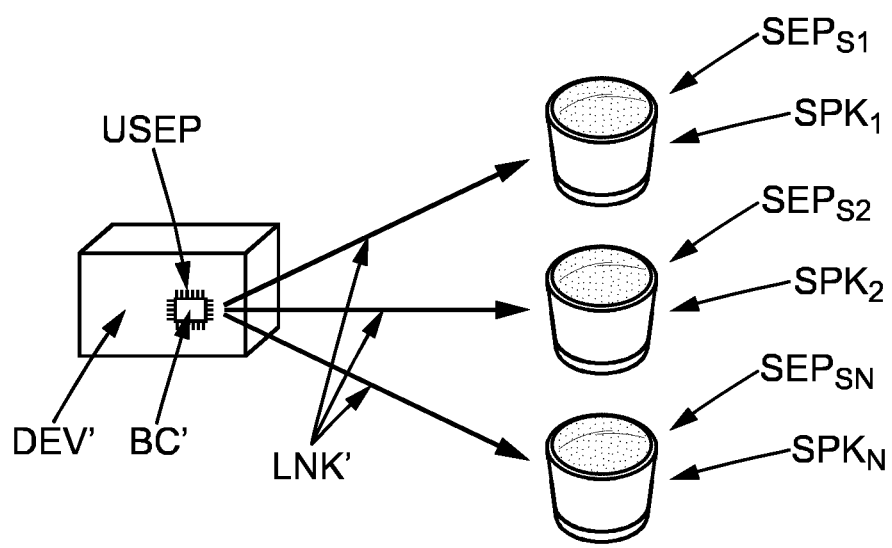
FIG. 7 illustrates a system comprising a device according to an embodiment of the invention as well as a set of Bluetooth speakers.
Figure 8:
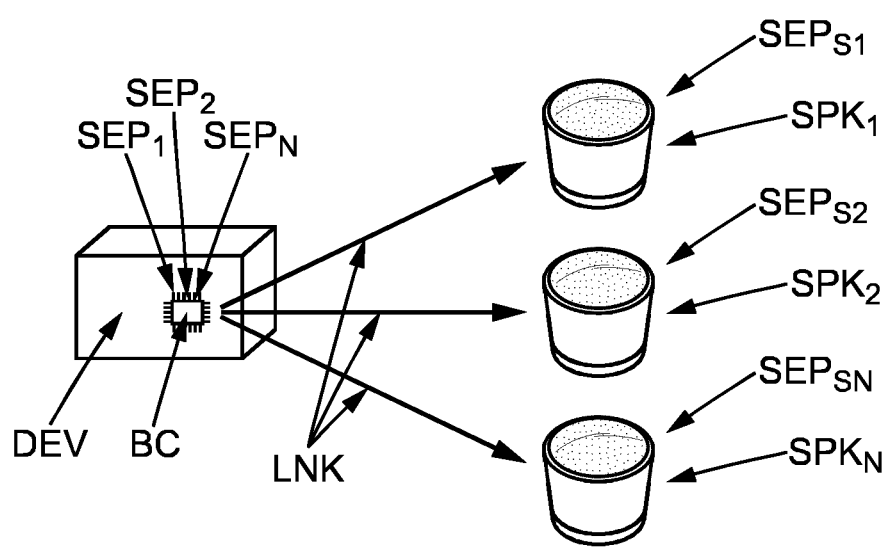
FIG. 8 illustrates a variant of the system of FIG. 7.

For the sake of completeness, reference is made to FIGS. 6 to 8, which describe techniques for performing point-to-multipoint A2DP control function from a source device, such as the device DEV of FIG. 1 or 3, on a plurality of wireless speakers.

FIG. 6 illustrates a communication between a profile A2DP' according to an embodiment of the example of FIG. 4, said profile used by a master device called a "Source" (which corresponds to a device emitting an audio stream), and a conventional A2DP profile used by a Sink device. The Sink device corresponds for example to a Bluetooth speaker, it being understood that a Bluetooth speaker can comprise multiple Sink SEPs (multiple Sink SEPs can therefore correspond to the same Bluetooth speaker, each Sink SEP being able to correspond to a respective codec among all the codecs supported by that Bluetooth speaker).

In practice, the Bluetooth stacks of Bluetooth chip manufacturers only introduce one Source SEP per codec and per Bluetooth chip. It is therefore impossible to connect several audio devices (speakers for example) to a mobile phone, for a given codec.

The A2DP' profile differs from the A2DP profile in that an AVDTP' layer is used instead of the AVDTP layer. The AVDTP' layer provides all the functions of the AVDTP layer but in addition it allows a synchronized point-to-multipoint connection.

FIG. 8 illustrates a system comprising at least three Bluetooth speakers SPK1, SPK2 and SPKN each associated with a respective Sink SEP SEPS1, SEPS2, SEPSN (as mentioned above, each speaker SPKi could be associated with multiple Sink SEPs rather than a single Sink SEP SEPSi, but for simplification only the Sink SEP actually used is represented). The system also comprises a device DEV' for controlling Bluetooth speakers according to one possible implementation of the invention. The device DEV' comprises a Bluetooth chip BC'. This Bluetooth chip BC' stores a unique SEP USEP identifying it. This Bluetooth chip BC' establishes a point-to-multipoint link LNK' with the three Bluetooth speakers SPK1, SPK2 and SPKN, via respective SEPs SEPS1, SEPS2 and SEPSN.

FIG. 8 illustrates a system comprising at least three Bluetooth speakers SPK1, SPK2 and SPKN each associated with a respective Sink SEP SEPS1, SEPS2, SEPSN (as mentioned above, each speaker SPKi could be associated with multiple Sink SEPs rather than a single Sink SEP SEPSi, but for simplification only the Sink SEP actually used is represented). The system also comprises a device DEV for controlling Bluetooth speakers according to one possible implementation of the invention. The device DEV comprises a Bluetooth chip BC. This Bluetooth chip BC stores at least three SEPs SEP1, SEP2 and SEPN which simulate three different Bluetooth chips (but these are virtual Bluetooth chips because there is actually only one). The Bluetooth chip BC establishes a point-to-multipoint link LNK with the at least three Bluetooth speakers SPK1, SPK2 and SPKN, but from the point of view of the Bluetooth standard, this link LNK appears to be a set of (at least) three point-to-point links. In effect, the SEP SEP1 is connected to an SEP SEPS1 of speaker SPK1, the SEP SEP2 is connected to an SEP SEPS2 of speaker SPK2, and the SEP SEPN is connected to an SEP SEPSN of speaker SPKN.

A first embodiment relates to the device DEV of FIGS. 1, 3, 4 and 8 for controlling wireless multimedia devices. The control device DEV is, for example, a dedicated device, or an optional additional module to be attached physically or wirelessly to one of the multimedia devices (for example to one of the wireless speakers). The control device DEV may also be, for example, a computer, a mobile phone, or a tablet.

In one embodiment, a wireless communication circuit BC of the device DEV is arranged to receive a wireless multimedia device identifier from each wireless multimedia device. The providing of identification compensates for the fact that the multimedia devices are unknown. In an example, the wireless multimedia device identifier is a network identifier such as a MAC address. In another embodiment, a wireless communication circuit BC of the device DEV is arranged to receive a group identifier to indicate a plurality of wireless multimedia devices sharing one or more characteristics. In an example, the group identifier identifies the wireless multimedia device having the same or similar model device from a particular vendor. For example, the group identifier is Bluetooth® attribute such as the "vendor ID", "productID", "Chip ID", "SpecificationID", "Version" and their combination. A Bluetooth speaker (or more generally a Bluetooth device) automatically provides an identifier when it connects to a master device. It is therefore not necessary to modify the Bluetooth speaker (a state of the art Bluetooth speaker is suitable for the invention).

The device DEV comprises an access circuit DBC for accessing a database DB of wireless multimedia devices, arranged for obtaining from said database the characteristics of each wireless multimedia device for which the wireless communication circuit has received an identifier. These characteristics may include the various protocols supported by the wireless multimedia device, enabling the control device to choose the most appropriate protocol. A prerequisite for implementing the first embodiment therefore consists of listing the different types of existing wireless multimedia devices and their identifier, determining their relevant characteristics, and saving them in a database.

The circuit DEV comprises a separation circuit SEC for separating a main audio stream into as many separated multimedia streams as the wireless communication circuit has received identifiers of wireless multimedia devices. For example, the multimedia stream is or comprises a main audio stream, and the main audio stream comprises a plurality of distinct multiplexed streams (for example left stereo channel and right stereo channel), and the separation consists of extracting each of these two streams. In a very simple variant, the separation consists of duplicating as many copies as necessary of a single stream that has been received.

According to a more complex variant, the device DEV is arranged to recreate, from a single stream or from several streams, a greater number of streams. For example, the separation circuit can recreate a multichannel environment (for example 5.1 surround sound) from a single channel (by signal processing).

The circuit DEV comprises an allocation circuit AC for allocating each separated multimedia stream to a respective wireless multimedia device. According to one possible implementation, the allocation circuit is called upon first, and it is only after the streams are allocated that these streams are extracted (separated) from the main stream. Alternatively, the circuit DEV begins by separating the streams by means of the separation circuit SEC, and then it allocates these separated streams.

The circuit DEV comprises a synchronization circuit SYC for synchronizing the separated multimedia streams based on characteristics of the wireless multimedia devices for which the wireless communication circuit has received an identifier.

According to a second embodiment, the characteristics of each wireless multimedia device SPK1, SPK2, SPKN of a device for controlling wireless multimedia devices according to the first embodiment include a latency of said multimedia device. The synchronization circuit SYC is arranged to temporally shift the transmission of a separated multimedia stream intended for a wireless multimedia device, based on its latency. This second embodiment eliminates one of the two main causes of desynchronization, namely the difference in internal latency. The proposed synchronization is a synchronization that can be described as static, as it is based on static characteristics such as the latency of the multimedia device. This latency is defined, for example, as the time that elapses between the moment when the wireless multimedia device receives a stream and the moment when that stream is actually reproduced by the wireless multimedia device. This time is fixed for wireless speakers. Moreover, for a given slave device, the database may include a plurality of possible latencies. For instance, each internal latency associated to a given slave device is associated to a specific codec used for encoding and decoding the data exchanged between the master device and the slave device using their Bluetooth link. For all or part of the possible codecs, and for at least one slave device, a plurality of internal latencies may be present in the database DB. In fact, for a given codec, the internal latency of a slave device may vary from one configuration of the codec to another. Various configuration parameters may indeed influence latency, such as the quality of sound, the number of sound channels (e.g. mono, stereo) used, etc. At a given time, the specific codec used for a given slave device SDij and its configuration is known from the master device MDi, whereby this information is accessible to the latter. Different wireless multimedia devices have different latencies, and the static synchronization takes them into account in order to eliminate the time lags associated with these differences in latency.

Another possible cause of desynchronization is related to a loss of connection between the device for controlling wireless multimedia devices and at least one wireless multimedia device. This is a desynchronization that can be described as dynamic, as it depends on the particular context in which the multimedia stream concerned is reproduced (noise, interference, introduction of an object impeding wireless transmission, moving a portable multimedia device outside the field of the control device DEV, etc.). Under these circumstances, a wireless multimedia device which loses its connection with the control device is no longer synchronized with the other wireless multimedia devices when the connection with the control device is restored. In principle, this wireless multimedia device is receiving the lost packets even though the subsequent packets are being sent at the same time to the other wireless multimedia devices. To avoid this type of desynchronization, a first technique consists of never retransmitting lost multimedia stream packets. But in circumstances where the retransmission of such lost packets would have been possible, this unnecessarily degrades the playback quality of the multimedia stream. It is useful in some circumstances, however. For example, some wireless multimedia devices have limited protocol capabilities. For example, they may support a basic protocol that manages only the transmission of packets and does not check whether the sent packets have reached their destination and have arrived intact, and so do not attempt to retransmit lost packets (ignoring the existence of packet loss). They may also support a reliable protocol which does not allow any packet loss (when loss or corruption is detected, the packet is resent). But such a reliable protocol is likely to block communications if the wireless multimedia device is not reachable, because it endlessly attempts to resend the lost packets. If the database indicates that a wireless multimedia device supports only a basic protocol and a reliable protocol of the aforementioned types, in one possible implementation the control device chooses the basic protocol, accepting the risk of lost packets, in order to preserve the synchronization (a desynchronized packet is often more of a nuisance than a missing packet).

According to a third embodiment, a device DEV for controlling wireless multimedia devices according to one of the first and second embodiments is arranged, when a multimedia stream packet intended for a wireless multimedia device is lost, to resend said multimedia stream packet to said wireless multimedia device. Each wireless multimedia device comprises a buffer memory. The synchronization circuit SYC is arranged to determine a fill level of the buffer memory BUF1, BUF2 and BUFN of at least one wireless multimedia device SPK1, SPK2, SPKN, and to determine a maximum duration, during which the device for controlling wireless multimedia devices can resend a lost multimedia stream packet to a wireless multimedia device, based on the fill level of the buffer memory of the at least one wireless multimedia device.

This is dynamic synchronization, which solves the aforementioned problem of loss of connection. The control device first tries to retransmit any lost packets. If it does not succeed, instead of blocking the system, the control device DEV, after a certain threshold duration (dynamically determined), stops attempting to retransmit the multimedia data which are not going through. On the other hand, there is a potential loss of data (portions of the multimedia stream may be permanently lost).

In order to determine a fill level of the buffer memory BUF1, BUF2 and BUFN of each wireless multimedia device SPK1, SPK2, SPKN, the control device DEV estimates for example the remaining read time for this memory. When, at time t0, the control device DEV sends a multimedia stream of duration T corresponding to n bytes to a first wireless multimedia device, it waits for confirmation of receipt of these n bytes by this first wireless multimedia device. The control device then considers, at time t within [t0; t0+T], that a multimedia stream duration equal to t0+T−t remains in the buffer memory of the first wireless multimedia device. Thus, at time t, the control device can, for a duration t0+T−t, attempt to resend packets lost by a second wireless multimedia device with no risk of blocking the streaming of the first wireless multimedia device. After a duration t0+T−t, it is imperative for the first wireless multimedia device to have received the next sequence of the multimedia stream that it is streaming. If it has not, the first wireless multimedia device would stop streaming due to lack of data. The control device therefore ceases its attempt to retransmit lost packets when it determines by the aforementioned method that such a retransmission would block the streaming of another wireless multimedia device. Where appropriate, if bandwidth again becomes available while the second wireless multimedia device has not finished playing the contents of its buffer memory (based on an estimate of the aforementioned type), a new attempt to transmit the lost packet can occur.

With these arrangements, when a sufficiently short loss of connection occurs, the streaming of the multimedia stream on all the wireless multimedia devices remains synchronized. In the event of too long a loss of connection, the streaming is interrupted on the wireless multimedia devices affected by the loss of connection, but the streaming continues normally on the other wireless multimedia devices.

According to one possible implementation, the control device gives preference to transmitting the most recent packets. When multimedia devices that have lost their connection to the control device reestablish their connection, they receive packets synchronized with the other multimedia devices, not the packets that were previously lost.

According to a fourth embodiment, a method for controlling wireless multimedia devices comprises the receiving REC, by a wireless communication circuit, of a wireless multimedia device identifier ID1, ID2, IDN from each wireless multimedia device SPK1, SPK2, SPKN. According to one possible implementation, the wireless communication circuit is a Bluetooth chip. According to one implementation, the wireless communication circuit is an assembly composed of a processor associated with a memory storing an appropriate computer program. According to another implementation, the communication circuit is a dedicated electronic chip, which is for example an FPGA or any other suitable circuit, including a custom-designed ad hoc circuit. According to a variant, the method is partially implemented by a dedicated electronic chip such as the aforementioned dedicated chips, and partially by a processor executing a suitable computer program.

The method comprises the obtaining OBT, by an access circuit for accessing a database DB of wireless multimedia devices, of characteristics LAT1, LAT2, LATN of each wireless multimedia device for which an identifier ID1, ID2, IDN has been received by the wireless communication circuit BC. According to one implementation, the access circuit is an assembly composed of a processor associated with a memory storing an appropriate computer program. According to another implementation, the access circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

The method comprises the separation SPR, by a stream separation circuit, of a main multimedia stream into as many separated multimedia streams as the wireless communication circuit has received wireless multimedia device identifiers. According to one implementation, the separation circuit SPR is an assembly composed of a processor associated with a memory storing an appropriate computer program. According to another implementation, the separation circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

The method comprises the allocation ATT, by an allocation circuit, of each separated multimedia stream to a respective wireless multimedia device. According to one implementation, the allocation circuit ATT is an assembly composed of a processor associated with a memory storing an appropriate computer program. According to another implementation, the allocation circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

The method comprises the synchronization SYN, by a synchronization circuit, of the separated multimedia streams based on characteristics of the wireless multimedia devices for which the wireless communication circuit has received an identifier. According to one implementation, the synchronization circuit is an assembly composed of a processor associated with a memory storing an appropriate computer program.

According to another implementation, the synchronization circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

According to one possible implementation, the wireless communication circuit, the access circuit, the separation circuit, the allocation circuit, and the synchronization circuit share the same processor or even the same memory chip (in the latter case, the memory chip can store computer programs specific to each of these circuits, at different addresses).

According to a fifth embodiment, the characteristics of each wireless multimedia device of a method for controlling wireless speakers according to the fourth embodiment include a latency LAT1, LAT2, LATN of said wireless multimedia device SPK1, SPK2, SPKN. The synchronization circuit temporally shifts the transmission of a separated multimedia stream intended for a wireless multimedia device, based on its latency.

According to a sixth embodiment, a method for controlling wireless speakers according to one of the fourth and fifth embodiments is arranged so that when a multimedia stream packet (for example an audio stream packet) intended for a wireless multimedia device is lost, the method resends (step RSND) said multimedia stream packet to said wireless multimedia device. As each wireless multimedia device comprises a buffer memory, the synchronization circuit determines DET a fill level of the buffer memory of at least one wireless multimedia device, and determines a maximum duration during which the device for controlling wireless multimedia devices can resend a lost multimedia stream packet to a wireless multimedia device based on the fill level of the buffer memory of the at least one wireless multimedia device.

According to one possible implementation, the wireless communication circuit, the access circuit, the separation circuit, the allocation circuit and the synchronization circuit share the same processor or even the same memory chip (in the latter case, the memory chip can store computer programs specific to each of these circuits, at different addresses).

According to a seventh embodiment, a computer program comprises a series of instructions which, when executed by a processor, implement a method according to one of the fourth to sixth embodiments. This computer program is written as already described above.

According to an eighth embodiment, a computer-readable non-transitory storage medium stores a computer program according to the seventh embodiment.

According to one possible implementation, the storage medium is implemented as already described above.

A ninth embodiment relates to a device (for example DEV or DEV') for controlling Bluetooth multimedia devices, this control device comprising a Bluetooth chip (for example BC or BC').

Bluetooth multimedia devices are, for example, Bluetooth speakers. "Bluetooth speaker" indicates any Bluetooth device containing at least one loudspeaker arranged to broadcast a sound that can be simultaneously heard by multiple people. It may, for example, be an acoustic speaker for a hi-fi system, or a mobile phone equipped with a loudspeaker intended to be audible to multiple people, provided that it is this loudspeaker that is controlled by the control device. More precisely, "sound that can be simultaneously heard by multiple people" is understood to mean a sound that is perceptible (in the sense that its content can be distinguished) by any person with normal hearing positioned at a distance of at least one meter from the speaker, in the presence of ambient noise corresponding to that of a conversation, meaning approximately 40 dB SPL. A headset, an ear bud, or a telephone receiver are therefore not speakers within the meaning of the present application, since they must be positioned in or against the ear in order to hear the emitted sounds.

According to one possible implementation, the Bluetooth multimedia devices are Bluetooth headsets. Such headsets are for example connected with a television and need to be synchronized with each other in addition to being synchronized with a video stream playing on the television.

More generally, each of the Bluetooth multimedia devices can be a Bluetooth television, a Bluetooth screen, a Bluetooth mobile phone, a Bluetooth laptop or desktop, a Bluetooth tablet, a Bluetooth system, a Bluetooth car stereo, or a Bluetooth digital media player.

The control device DEV or DEV' is, for example, a Bluetooth television, a Bluetooth screen, a Bluetooth mobile phone, a Bluetooth laptop or desktop, a Bluetooth tablet, a Bluetooth hi-fi system, a Bluetooth car stereo, a Bluetooth digital media player or an intelligent personal assistant.

The Bluetooth chip (for example BC or BC' in the figures) is arranged to implement a modified A2DP profile (denoted A2DP' in FIG. 6) so as to create a point-to-multipoint link (for example LNK or LNK') from said Bluetooth chip to a plurality of Bluetooth multimedia devices SPK1, SPK2, SPKN. The Bluetooth chip of the control device is arranged to transmit a plurality of multimedia streams related to each other, each intended for a respective Bluetooth multimedia device among said plurality of Bluetooth multimedia devices, while relying on a non-blocking usage of Bluetooth. It is understood that multimedia streams "related to each other" means that the multimedia streams relate to the same situation (for example the same scene or the same music) but may nevertheless be different. For example, the multimedia streams can be six audio streams each corresponding to one of the 5.1 channels of an audio recording, or can be several videos of the same scene, filmed at the same time but from different viewpoints. The control device is for example arranged to transmit an audio stream (or more generally a multimedia stream) via a Bluetooth wireless link. For example, it stores or relays a multimedia stream comprising at least an audio channel. For example, it stores MP3 files, or connects to a server (such as a Youtube® server) from which it downloads a stream that it progressively and simultaneously retransmits via Bluetooth to multiple Bluetooth multimedia devices.

By relying on a non-blocking usage of Bluetooth instead of the blocking usage that is the default in A2DP, the control device avoids loss of synchronization. "Non-blocking usage of Bluetooth" is understood to mean any configuration of Bluetooth (via a Bluetooth mode and/or via other Bluetooth parameters) that does not block the Bluetooth chip of the device for controlling Bluetooth multimedia devices. A non-blocking usage of Bluetooth is therefore a use of Bluetooth which avoids forcing the Bluetooth chip to retransmit an unreceived packet as long as it has not been received, and which also avoids forcing it to retransmit such a packet beyond the moment when at least one Bluetooth multimedia device no longer has data in its buffer memory due, for example, to unsuccessful packet retransmission attempts monopolizing the Bluetooth communications. A non-blocking usage corresponds to a set of parameters (FTO, QoS, Mode, Extended Flow features) and not only to a mode (such as SM mode) in the sense of the Bluetooth standard. This involves for example the "Flow Control" mode or any mode in which the "Flush Timeout" parameter is set according to the Bluetooth standard to prevent any retransmission. Conversely, a blocking usage is a usage which leads, for example, to retransmitting data as long as it has not been received, or which leads to retransmitting data when a higher priority Bluetooth multimedia device is also awaiting data and has not received them because of said use (it is therefore blocked). Blocking usage is used in the prior art because it avoids occasional data losses (in the event of a prolonged cutoff for a period exceeding a given threshold, blocking usage does not prevent loss of data). In the assumption that Bluetooth is adapted to allow point-to-multipoint streaming, employing a non-blocking usage eliminates the risk of a Bluetooth multimedia device becoming inaccessible and preventing any transmission of data to all the Bluetooth multimedia devices. A Bluetooth multimedia device may become inaccessible for example because it has been moved out of range of the Bluetooth chip of the control device DEV, or because it contains a battery that has been exhausted, or for any other reason.

The default Bluetooth L2CAP settings mentioned in the introduction are not suitable for setting up an A2DP synchronized link of a Bluetooth master device to multiple Bluetooth slave devices. Indeed, if one of the links established between the master and a slave (for example a speaker) is configured with an infinite "Flush Timeout", and if the speaker leaves the Bluetooth field or is powered by a battery which is then exhausted, then the data will be continually sent to the speaker which never receives it and will therefore block any other transmission of data to the other slave devices (as the data are sent sequentially). On the other hand, if the "Flush Timeout" parameter is defined by default, the resending of data to a speaker could cause a time lag between this speaker and the others. When a speaker that has left the Bluetooth field of the master Bluetooth device returns to said field, it would then continue broadcasting the stream from the point where it had stopped due to leaving said field.

According to one possible implementation, the device for controlling Bluetooth multimedia devices is arranged to determine automatically, from the different configurations supported by the Bluetooth stacks of the Bluetooth multimedia devices, the configuration to be adopted for each L2CAP channel (corresponding to a logical link between the Bluetooth chip of the device for controlling Bluetooth speakers and a Bluetooth multimedia device) so as to maintain a synchronized link between the device for controlling Bluetooth multimedia devices and the various slave multimedia devices. The L2CAP parameters of each of the multimedia devices may be different (they may depend on the characteristics of these multimedia devices, their ability to support certain protocols, etc.).

According to one possible implementation, the device for controlling Bluetooth multimedia devices is arranged to set all the Flush Timeouts for the various L2CAP channels to the value defined by the Bluetooth standard (namely 1, but this could vary depending on the implementations) so that no retransmission is performed. The connection thus obtained is unreliable in the sense that transmission errors or losses are not remedied, but ensures synchronization after any packet loss.

According to one possible implementation, the modification of the A2DP profile consists of modifying the AVDTP layer used by the A2DP profile, for example in one of the ways indicated below. In order to implement an AVDTP layer corresponding to a modified AVDTP layer, it is possible in particular to use an available implementation such as BlueZ (well known to those skilled in the art), designed to implement Bluetooth technology on Linux operating systems and available under the GNU GPL license. The BlueZ implementation has become a reference Bluetooth implementation for Linux and has been integrated into the Linux kernel.

According to a tenth embodiment, the Bluetooth chip of a device for controlling Bluetooth multimedia devices according to the ninth embodiment is arranged, when a multimedia stream packet that it has transmitted to a Bluetooth multimedia device is lost, to resend said multimedia stream packet to said Bluetooth multimedia device. The Bluetooth chip is arranged to determine a fill level of a buffer memory of at least one Bluetooth multimedia device SPK1, SPK2, SPKN, and to determine a maximum duration during which it can resend the lost multimedia stream packet to the Bluetooth multimedia device based on the fill level of the buffer memory of the at least one Bluetooth multimedia device.

According to one possible implementation, this maximum duration corresponds to the buffer memory that is the least full among the buffer memories of all the other Bluetooth multimedia devices, from which it is necessary to deduce the time required to transmit a sufficient multimedia stream portion. The content of the buffer memory of the Bluetooth multimedia device which has lost a packet is then not taken into account.

According to another implementation, this maximum duration corresponds to the buffer memory that is the least full among the buffer memories of all the Bluetooth multimedia devices (including the one that has lost the packet), from which it is necessary to deduce the time required to transmit a sufficient multimedia stream portion. If there is a risk that the Bluetooth multimedia device that has lost the packet will run out of multimedia stream data to be played, it may be considered more appropriate to abandon the attempt to retransmit the lost packet which in any case would be delayed in its playback and would therefore not be synchronized with the other Bluetooth multimedia devices.

According to another implementation, the Bluetooth chip is arranged to identify the Bluetooth multimedia devices for which it is not necessary to check the fill level of the buffer memory. For example, the Bluetooth chip may exclude a number n of the last Bluetooth multimedia devices to which it has supplied data to the buffer memories, if it can be deduced therefrom that other Bluetooth multimedia devices must necessarily exist whose buffer memories are less full and which will determine said maximum duration.

According to another implementation, the Bluetooth chip is arranged to store an identifier of the Bluetooth multimedia device whose buffer memory has not been fed data for the longest time. When a packet is lost, the Bluetooth chip only checks the buffer memory of that Bluetooth multimedia device whose buffer memory has not been fed data for the longest time.

According to one possible implementation, the control device is designed to transmit audio stream portions of approximately 14 ms (corresponding to the duration of an audio stream block encoded by the SBC codec). According to one possible implementation, the control device controls four Bluetooth multimedia devices, and the transmission of a portion of about 14 ms takes about 1.3 ms. It takes about 4*1.3 ms which is about 5.2 ms to transmit about 14 ms of stream to the four Bluetooth multimedia devices, which leaves about 14 ms-5.2 ms or about 8.8 ms during which the control device can identify corrupted packets or packets not transmitted and retransmit them.

According to one possible implementation, the device for controlling Bluetooth multimedia devices is arranged to configure the "Flush Timeout" of each L2CAP channel according to the fill state of the buffer memories of the Bluetooth multimedia devices, which it must estimate beforehand, for example by one of the aforementioned methods.

According to another possible implementation, it is considered the case where the "Flush Timeout" of a L2CAP channel indicates that an infinite number of retransmissions is allowed (i.e. retransmission is performed until the link is lost). In that case, the device for controlling Bluetooth multimedia device is arranged to request a flush of the packets present in the L2CAP layer which are associated with the L2CAP channel, when the device for controlling Bluetooth multimedia device considers that retransmission is not effective. The request will have the effect to reset all the pending retransmissions for the specific L2CAP channel so that new packets are transmitted. In an example, a retransmission is not considered effective where the size of the queue storing the packets to be retransmitted, is greater than a predetermined size value. In another example, a retransmission is not considered effective where congestion is detected in the queue storing the packets to be retransmitted.

According to one possible implementation, the Bluetooth chip of a device for controlling Bluetooth multimedia devices according to the tenth embodiment is arranged to generate a single SEP for controlling all the Bluetooth multimedia devices. More precisely, the A2DP profile of the Source SEP (the Bluetooth chip) is modified, for example by substituting a modified AVDTP' layer for a conventional AVDTP layer. The change consists of removing restrictions that prevent a Source SEP from connecting to more than one Sink SEP. However, the Bluetooth standard does not require checking a Sink SEP to verify that the Source SEP with which it communicates does not also communicate with another Sink SEP. It turns out that it is technically possible, from the same Source SEP, to broadcast multimedia streams (in particular audio) to multiple Sink SEPs from a single Bluetooth chip.

As the Bluetooth standard does not allow communication from one Source SEP to multiple Sink SEPs, the present implementation constitutes a sort of extension to the Bluetooth standard, an extension which does not create any difficulties since the Bluetooth standard is not designed to detect such an extension.

It is of course possible to provide, in the device for controlling Bluetooth multimedia devices, a plurality of Bluetooth chips each arranged to generate a single SEP for controlling the Bluetooth multimedia devices respectively managed by each one. For example, a Bluetooth chip no. 1 could manage multimedia devices numbered 1 to 5, a Bluetooth chip no. 2 could manage multimedia devices numbered 6 to 10, and a Bluetooth chip no. 3 could manage multimedia devices numbered 11 to 15. The maximum throughput of a Bluetooth chip limits the number of multimedia devices it can control, and if the number of multimedia devices exceeds a given threshold, the addition of a Bluetooth chip would allow controlling additional multimedia devices simultaneously.

According to a eleventh embodiment, the Bluetooth chip of a device for controlling Bluetooth multimedia devices according to the ninth or tenth embodiment is arranged to generate a plurality of SEPs for controlling the Bluetooth multimedia devices.

According to one advantageous implementation, the Bluetooth chip generates a separate Source SEP for each Sink SEP (corresponding to each Bluetooth multimedia device that it is to control). This is an alternative of the aforementioned implementation, where the Bluetooth chip is more in accordance with the Bluetooth standard. Indeed, the appearance is more that of point-to-point links and not a point-to-multipoint link. This is of course a trick which consists of generating a plurality of virtual SEPs in the same Bluetooth chip to simulate a plurality of Source devices where there is actually only one Bluetooth chip.

It is of course possible to provide a plurality of Bluetooth chips in the device for controlling Bluetooth multimedia devices, each arranged to generate as many Source SEPs as there are Bluetooth multimedia devices respectively managed by each one. For example, a Bluetooth chip no. 1 could manage Bluetooth multimedia devices numbered 1-5 using respective Source SEPs SEP1 to SEP5, a Bluetooth chip no. 2 could manage Bluetooth multimedia devices numbered 6 through 10 using respective Source SEPs SEP6 to SEP10, and a Bluetooth chip no. 3 could manage Bluetooth multimedia devices numbered 11 to 15 using respective Source SEPs SEP11 to SEP15. The maximum throughput of a Bluetooth chip limits the number of multimedia devices it can control, and if the number of multimedia devices exceeds a given threshold, the addition of a Bluetooth chip would allow controlling additional multimedia devices simultaneously. The number of Source SEPs generated by a Bluetooth chip does not affect the bandwidth available in this Bluetooth chip, which remains the same but is shared between these different Source SEPs. According to one possible implementation, the Bluetooth chip creates a maximum of seven Source SEPs in order to use a piconet to manage the Bluetooth multimedia devices that it controls. A piconet is a network comprising from 1 to 8 Bluetooth devices: a single master Bluetooth device (i.e. Source) and up to 7 slave Bluetooth devices (i.e. Sink), as is specified by the Bluetooth standard. The limitation to seven Sink devices per Source device arises from Bluetooth addressing, which identifies each slave Bluetooth device using three bits, 000 being reserved for a specific mode called "Connectionless Broadcast".

According to a twelfth embodiment, the Bluetooth chip of a device for controlling Bluetooth multimedia devices according to one of the ninth to eleventh embodiments is arranged to control up to five Bluetooth multimedia devices, using an SBC codec. "Control up to five Bluetooth multimedia devices" is understood to mean that regardless of the audio stream SBC that is transmitted, it is possible to stream this stream on five speakers. If there are less than five speakers, this becomes all the more possible.

A stereo audio stream of good quality, so-called CD quality, has a sampling rate of 44.1 kHz and uses 16-bit samples for the audio signal. Each second, 44,100 16-bit samples are therefore provided for the left channel and 44,100 other 16-bit samples are provided for the right channel. The raw bit rate of such a stream is thus 44,100*2*16 bit/s, which is a little more than 1.4 Mbit/s. Such a bit rate is very high, and it is therefore useful to compress it in order to reduce the bandwidth required during transmission, in particular a Bluetooth transmission where the throughput is not very high. Codecs are used to achieve this compression. The SBC codec is a very simple and very effective codec. "Effective" is understood to mean that the SBC codec requires very little memory and CPU resources to function. This is very useful for Bluetooth chips, which often have limited memory and computing power. The SBC codec is free. It is also advantageous because it is very widespread, and thus ensures great interoperability. However, it is rather inefficient in terms of compression rate and audio quality. The bit rate of an audio stream encoded by an SBC codec is at most 345 kbit/s (in some cases, SBC generates a lower bit rate, in particular in order to adapt to the available bandwidth, and thus allows controlling more than five Bluetooth multimedia devices if required). More powerful codecs exist, however. For example, an AAC codec generates a compressed audio stream of approximately 192 kbit/s of a quality substantially equivalent to that of a 345 kbit/s SBC stream. Apt-X codecs also provide improved performance (lower bit rate at equivalent quality), but are not free.

Similarly to conventional Bluetooth speakers, the practical Bluetooth bandwidth for EDR compatible devices ("Enhanced Data Rate") is about 1 Mbit/s. It is thus possible to accommodate at least five streams encoded by an SBC codec (at a maximum of 345 kbit/s) in the available bandwidth. However, other bitrates with the same codec may be contemplated. In one possible implementation, the Bluetooth chip uses the SBC codec to allow transmitting 3, 4, 5 and 7 encoded SBC streams at 328, 229, 193 and 127 kbit/s, respectively.

According to one possible implementation, the Bluetooth chip uses an AAC codec, which theoretically allows transmitting five encoded AAC streams at 192 kbit/s. It is nevertheless advantageous, according to one possible implementation, to limit the number of AAC streams in order to be able to set up a piconet according to the Bluetooth standard. In other alternatives, other codecs are used, and it is possible to transmit up to seven encoded streams, or less if the bit rate of the encoded stream is than 142 kbit/s (in this case the number of possible encoded streams is equal to the ratio of about 1,000,000 and the bit rate of an encoded stream expressed in bit/s).

A thirteenth embodiment relates to a method for controlling Bluetooth multimedia devices by a Bluetooth chip. The Bluetooth chip implements a modified A2DP profile (denoted A2DP') so as to create a point-to-multipoint link from said Bluetooth chip to a plurality of Bluetooth multimedia devices, the Bluetooth chip transmitting a plurality of multimedia streams related to each other, each intended for a respective Bluetooth multimedia device among said plurality of Bluetooth multimedia devices, while relying on a non-blocking usage of Bluetooth.

According to one possible implementation, the Bluetooth chip comprises a processor and executes a computer program adapted to implement an A2DP' profile so as to create a point-to-multipoint link from said Bluetooth chip to a plurality of Bluetooth multimedia devices, the Bluetooth chip transmitting a plurality of multimedia streams related to each other, each intended for a respective Bluetooth multimedia device among said plurality of Bluetooth multimedia devices, while relying on a non-blocking usage of Bluetooth.

According to an alternative implementation, it is a device for controlling Bluetooth multimedia devices comprising said Bluetooth chip which also comprises a processor and executes a computer program adapted to implement an A2DP' profile so as to create a point-to-multipoint link from said Bluetooth chip to a plurality of Bluetooth multimedia devices, the Bluetooth chip transmitting a plurality of multimedia streams related to each other, each intended for a respective Bluetooth multimedia device among said plurality of Bluetooth multimedia devices, while relying on a non-blocking usage of Bluetooth.

In the two aforementioned implementations, the computer program is stored in a memory (for example EEPROM, Flash, or ROM). This memory may be embedded in the Bluetooth chip or in the device for controlling Bluetooth multimedia devices but outside the Bluetooth chip. According to a variant, the computer program is stored partly in the Bluetooth chip and partly in the device for controlling Bluetooth multimedia devices. According to a variant, the device for controlling Bluetooth multimedia devices and the Bluetooth chip each comprise at least one separate processor, and each executes a portion of the computer program which is stored either in a single location (single memory chip) or in a distributed manner in multiple memory chips (for example a memory chip of the Bluetooth chip and a memory chip of the device for controlling Bluetooth multimedia devices).

According to another implementation, the method is implemented not by a computer program but by a dedicated electronic chip, which is for example an FPGA or any other suitable circuit, including an ad hoc circuit. According to a variant, the method is partially implemented by a dedicated electronic chip such as a dedicated chip as mentioned above, and partially by a processor executing a suitable computer program.

According to a fourteenth embodiment, the Bluetooth chip of a method for controlling Bluetooth multimedia devices according to the thirteenth embodiment, when a multimedia stream packet that the Bluetooth chip has transmitted to a Bluetooth multimedia device is lost, resends said multimedia stream packet to said Bluetooth multimedia device, and determines a fill level of a buffer memory of each Bluetooth multimedia device SPK1, SPK2, SPKN in order to deduce therefrom a maximum duration during which it can resend the lost multimedia stream packet to the Bluetooth multimedia device based on the fill level of the buffer memory of the Bluetooth multimedia devices.

According to a fifteenth embodiment, the Bluetooth chip of a method for controlling Bluetooth multimedia devices according to the thirteenth or fourteenth embodiment generates several SEPs SEP1, SEP2, SEPN for controlling the Bluetooth multimedia devices SPK1, SPK2, SPKN.

According to a sixteenth embodiment, the Bluetooth chip of a method for controlling Bluetooth multimedia devices according to one of the thirteenth to fifteenth embodiments controls five Bluetooth multimedia devices by using an SBC codec.

An seventeenth embodiment relates to a computer program comprising a series of instructions which, when executed by a processor, implement a method according to one of the thirteenth to sixteenth embodiments. This computer program is written as already described above.

A eighteenth embodiment relates to a computer-readable non-transitory storage medium storing a computer program according to the seventeenth embodiment.

According to one possible implementation, the storage medium is implemented as already described above.

The invention is not limited to the embodiments described above by way of example. The usable memories cover any type of memory.

The embodiments described in relation to the device for controlling wireless multimedia devices can be transposed to the methods for controlling wireless multimedia devices, as well as to the computer programs and to the program storage media according to embodiments of the invention, and vice versa. In addition, the first to eighth embodiments may be combined with the ninth to the eighteenth embodiments. For example, it is possible in the ninth to the eighteenth embodiments to query a database as provided for in the first embodiment, in order to recognize the characteristics of the Bluetooth multimedia devices, for example their latencies. Conversely, it is possible to provide, for example, that the first to eighth embodiments implement a Bluetooth wireless protocol modified in any manner as set forth in the ninth to the eighteenth embodiments.

The invention claimed is:

1. A device for controlling a dual-mode Bluetooth low energy multimedia device, having a first sound system adapted to be associated with at least one Bluetooth multimedia device and a second sound system adapted to be associated with at least one Bluetooth Low Energy multimedia device the controlling device comprising:
   an access circuit arranged to obtain a first signal processing latency value of the first sound system and a second signal processing latency value of the second sound system,
   a separation circuit arranged to separate an input multimedia stream into a first multimedia signal and a second multimedia signal,
   a synchronization circuit arranged to delay the first and second multimedia signals based on the first and second signal processing latency values,
      wherein the synchronization circuit is further arranged to:
      determine a maximum signal processing latency value of the first and second signal processing latency values,
      determine a first and a second subtraction value by respectively subtracting the first and second signal processing latency value from the maximum signal processing latency value, and
   delay the first and second multimedia signal by the first and a second subtraction value, respectively, and
   a transmission circuit arranged to respectively transmit the delayed first and second multimedia signals to the first and second sound systems.

2. The controlling device of claim 1, wherein the synchronization circuit is further arranged to:
   further delay the first and second multimedia signals by a predetermined signal processing latency value.

3. A dual-mode Bluetooth low energy multimedia device the dual-mode Bluetooth low energy multimedia device having a first sound system adapted to be associated with at least one Bluetooth multimedia device and a second sound system adapted to be associated with at least one Bluetooth Low Energy multimedia device, the dual-mode Bluetooth low energy multimedia device comprising:
   a separation circuit arranged to separate an input multimedia stream, into a first multimedia signal and a second multimedia signal and to respectively direct the first and second multimedia signals to the first and second sound systems,
   and wherein,
   the first sound system comprises,
      an access circuit arranged to obtain a first signal processing latency value of the second sound system, and
      a synchronization circuit arranged to delay the first multimedia signal based on the first signal processing latency value and an internal signal processing latency value of the first sound system,
   the second sound system comprises,
      an access circuit arranged to obtain a second signal processing latency value of the first sound system, and
      a synchronization circuit arranged to delay the second multimedia signal based on the second signal processing latency value and an internal signal processing latency value of the second sound system.

4. The dual-mode Bluetooth low energy multimedia device of claim 3, wherein each of the synchronization circuits is further arranged to:
   determine a maximum signal processing latency value of the obtained signal processing latency value and the internal signal processing latency value of the respective sound system,
   determine a subtraction value by subtracting the internal signal processing latency value of the respective sound system from the maximum signal processing latency value,
   delay the multimedia signal by the subtraction value, and
   further delay the multimedia signal by a predetermined signal processing latency value.

5. A system comprising:
   a controlling device according to claim 1 for providing a first multimedia signal and a second multimedia signal in response to receiving an input multimedia stream and
   at least one dual-mode Bluetooth low energy multimedia device having a first sound system adapted to be associated with at least one Bluetooth multimedia device and a second sound system adapted to be associated with at least one Bluetooth Low Energy multimedia device,
   wherein,
   the first sound system comprises,
      an access circuit arranged to obtain a first signal processing latency value of the second sound system, and a synchronization circuit arranged to delay the first multimedia signal based on the first signal processing latency value and an internal signal processing latency value of the first sound system, the second sound system comprises, an access circuit arranged to obtain a second signal processing latency value of the first sound system, and a synchronization circuit arranged to delay the second multimedia signal based on the second signal processing latency value and an internal signal processing latency value of the second sound system.

6. The system of claim 5 further comprising, at least one Bluetooth multimedia device and at least one Bluetooth Low Energy multimedia device.

7. The device of claim 1, wherein the access circuit is further arranged to obtain the first and/or second signal processing latency values from a database of the dual-mode Bluetooth low energy multimedia device.

8. A method of controlling a dual-mode Bluetooth low energy multimedia device the dual-mode Bluetooth low energy multimedia device having a first sound system adapted to be associated with at least one Bluetooth multimedia device and a second sound system adapted to be associated with at least one Bluetooth Low Energy multimedia device the method comprising:

obtaining respectively, a first signal processing latency value and a second signal processing latency value of the first and second sound systems, separating an input multimedia stream into a first multimedia signal and a second multimedia signal, delaying the first and second multimedia signals based on the first and second signal processing latency values, wherein the delaying further comprises:

determining a maximum signal processing latency value of the first and second signal processing latency values, determining a first and a second subtraction value by respectively subtracting the first and second signal processing latency value from the maximum signal processing latency value, delaying the first and second multimedia signal by first and a second subtraction value, respectively, and transmitting respectively, the delayed first and second multimedia signals to the first and second sound systems.

9. The method of claim 8, wherein the delaying further comprising:

further delaying the first and second multimedia signal by a predetermined signal processing latency value.

10. A method of controlling a dual-mode Bluetooth low energy multimedia device the dual-mode BLE Bluetooth low energy multimedia device having a first sound system adapted to be associated with at least one Bluetooth multimedia device and a second sound system adapted to be associated with at least one Bluetooth Low Energy multimedia device the method comprising:

separating an input multimedia stream into a first multimedia signal and a second multimedia signal and respectively directing the first and second multimedia signals to the first and second sound systems, and further comprising, by the first sound system, obtaining a first signal processing latency value of the second sound system, and delaying the first multimedia signal based on the first signal processing latency value and an internal signal processing latency value of the first sound system, by the second sound system, obtaining a second signal processing latency value of the first sound system, and delaying the second multimedia signal based on the second signal processing latency value and an internal signal processing latency value of the second sound system.

11. The method of claim 10, further comprising, by each of the first and second sound systems:

determining a maximum signal processing latency value of the obtained signal processing latency value and the internal signal processing latency value of the respective sound system, determining a subtraction value by subtracting the internal signal processing latency value of the respective sound system from the maximum signal processing latency value, delaying the first and second multimedia signal by the subtraction value, and further delaying the first and second multimedia signal by a predetermined signal processing latency value.

12. The method of claim 8, wherein the obtaining further comprises obtaining the first and/or second signal processing latency values from a database of the dual-mode Bluetooth low energy multimedia device.

13. The device of claim 1, wherein the first sound system comprises a Basic Rate/Enhanced Data Rate controller and the second sound system comprises a Bluetooth low energy controller.

14. A non-transitory computer-readable storage medium, storing a computer program comprising a series of instructions that, when they are executed by a processor, implements a method according to claim 8.

15. A system comprising:

a controlling device according to claim 2 for providing a first multimedia signal and a second multimedia signal in response to receiving an input multimedia stream and at least one dual-mode Bluetooth low energy multimedia device having a first sound system adapted to be associated with at least one Bluetooth multimedia device and a second sound system adapted to be associated with at least one Bluetooth Low Energy multimedia device wherein, the first sound system comprises, an access circuit arranged to obtain a first signal processing latency value of the second sound system, and a synchronization circuit arranged to delay the first multimedia signal based on the first signal processing latency value and an internal signal processing latency value of the first sound system, the second sound system comprises, an access circuit arranged to obtain a second signal processing latency value of the first sound system, and a synchronization circuit arranged to delay the second multimedia signal based on the second signal processing latency value and an internal signal processing latency value of the second sound system.

16. The device of claim 2, wherein the access circuit is further arranged to obtain the first and/or second signal processing latency values from a database of the dual-mode Bluetooth low energy multimedia device.

17. The dual-mode Bluetooth low energy multimedia device of claim 3, wherein either one or each of the access circuits is further arranged to obtain the signal processing latency value from a database of the dual-mode Bluetooth low energy multimedia device.

18. The dual-mode Bluetooth low energy multimedia device of claim 4, wherein either one or each of the access circuits is further arranged to obtain the signal processing latency value from a database of the dual-mode Bluetooth low energy multimedia device.

19. The system of claim 5, wherein either one or each of the access circuits is further arranged to obtain the signal processing latency value from a database of the dual-mode Bluetooth low energy multimedia device.

20. The system of claim 6, wherein either one or each of the access circuits is further arranged to obtain the signal processing latency value from a database of the dual-mode Bluetooth low energy multimedia device.

\* \* \* \* \*

UNITED STATES PATENT AND TRADEMARK OFFICE
CERTIFICATE OF CORRECTION

| | |
|---|---|
| PATENT NO. | : 11,277,691 B2 |
| APPLICATION NO. | : 16/757234 |
| DATED | : March 15, 2022 |
| INVENTOR(S) | : Thomas Girardier, Julien Goupy and Nicolas Guezellot Prudhomme |

It is certified that error appears in the above-identified patent and that said Letters Patent is hereby corrected as shown below:

In the Claims

Claim 1, Column 21, Line 67: "and a second subtraction value, respectively, and" should read -- and second subtraction value, respectively, and --.

Claim 8, Column 23, Line 45: "and a second subtraction value, respectively, and" should read -- and second subtraction value, respectively, and --.

Signed and Sealed this
Twenty-fourth Day of May, 2022

Katherine Kelly Vidal
*Director of the United States Patent and Trademark Office*